(12) United States Patent
Heffernan et al.

(10) Patent No.: US 6,315,212 B1
(45) Date of Patent: Nov. 13, 2001

(54) FLOAT VENT

(76) Inventors: John Francis Steeple Heffernan, Flat 4, 244 Evering Road, London E5 8AJ (GB); Charles Bonello, 125 Parkdale Road, Plumstead, London SE18 1RW (GB)

( * ) Notice: Subject to any disclaimer, the term of this patent is extended or adjusted under 35 U.S.C. 154(b) by 0 days.

(21) Appl. No.: 09/573,731

(22) Filed: May 18, 2000

(30) Foreign Application Priority Data

Jul. 31, 1999 (GB) ................................................ 9917914

(51) Int. Cl.[7] .................................................. F16K 24/04
(52) U.S. Cl. ............................ 236/62; 137/200; 137/202
(58) Field of Search ................................. 137/200, 202; 236/62

(56) References Cited

U.S. PATENT DOCUMENTS 703,886 * 7/1902 Allen ........................................ 236/62
3,088,482 * 5/1963 Ostrem ................................... 137/200

* cited by examiner

Primary Examiner—Gerald A. Michalsky
(74) Attorney, Agent, or Firm—Sheridan Ross P.C.

(57) ABSTRACT

A float vent is described for automatically venting gas from liquid, such as air from water in a domestic radiator system. In addition to a float valve (2), a subsidiary valve (6) is provided that can seal the vent path and displace the float valve from its closed position. The subsidiary valve may be a thermostatic or hygroscopic valve, for example.

10 Claims, 8 Drawing Sheets

FLOAT VENT

BACKGROUND OF THE INVENTION

This invention relates to a device that automatically vents gas, for example air, from a liquid filled system, for example water.

Temperature change liberates gas present in solution which is precipitated in closed systems such as radiators causing reduced system efficiency. Gas venting devices are used in industrial and domestic applications as a means to expel gas products from liquid-filled systems so as to maintain the system efficiency. The most common example is an air vent valve on top of a domestic hot water radiator which is manually operated periodically by a key to release air that has entered the system.

Automatic vents are available and tend to fall into two categories (or a combination thereof). The first type currently commercially available is a float on a lever type vent which utilises raising water levels in the system to elevate a float which exerts force via a lever on a valve to close the air way. The weight of the float and lever cause the valve to open when the water level drops so allowing expulsion of unwanted air. This type is reliable, but large, due to the necessary weight of the float to open the airway against a pressure difference between system pressure inside the radiator and that of atmospheric pressure outside. This makes it aesthetically unacceptable, eliminating it as a viable option for fitting to most domestic radiators and is traditionally fitted as a single unit to a system high-point, which does not then vent air already collected in radiators.

The second type is a hygroscopic vent which is small but liable to leak water. Its operating principle utilises a series of fibre washers that allows the passage of air when they are dry but expand when contacted by water thus closing an exit port. This has been considered unreliable and British Standard BS 5449 does not recommend this type as it may permit water to escape for the first few seconds until the fibre washers expand.

The object of this invention is to provide an improved and more reliable automatic vent that is small, doesn't leak water, and may therefore be more acceptable for domestic and other applications that require miniaturisation of the vent.

SUMMARY OF THE INVENTION

According to the invention there is provided an automatic venting device for venting gas from a system containing liquid, comprising a body defining a connector for connecting to the system, a vent, a member defining an orifice and a valve seat on the member, the body defining a vent path from the connector through the orifice in the valve seat to the vent; a float valve movable between a closed position in which it engages the valve seat to close the vent path, and an open position in which it is spaced away from the valve seat to open the path, wherein the float valve sinks towards the open position in the absence of liquid in the system but is floated towards the closed position when liquid in the system reaches a predetermined level; and a subsidiary valve movable between an open position leaving the vent path open and a closed position in which the vent path is closed, wherein movement of the subsidiary valve to its closed position and back to its open position acts to move the float valve away from its closed position towards the open position.

Prior art vents using float valves have used the float valve alone as a single venting valve. Such prior art float valves have been too large for domestic use, and could not be shrunk. That is because radiator heating systems are pressurised in use and the pressure keeps the float valve in its raised position preventing venting even when the presence of air in the system causes the water level to drop.

In the apparatus according to the invention, on the other hand, the subsidiary valve causes the float valve to move away from its closed position to unseal it. The float valve is then no longer held in its closed position by air pressure and so venting can proceed if required.

The subsidiary valve may be a thermostatic valve which moves to its open position below a predetermined temperature and to its closed position above the predetermined temperature to close the flow path and engage the float valve to move it away from the float valve's closed position. The predetermined temperature may be in the range 30–80° C., preferably 30–50° C.

Alternatively, the apparatus may further comprise hygroscopic material that expands when in contact with liquid to move the subsidiary valve to its closed position, and contracts when the liquid level falls to allow the subsidiary valve to move to its open position. This allows the subsidiary valve to be controlled by water level.

A guide may be provided to locate the float valve constraining it to move between open and closed positions; the guide may comprise guide rails or it may be constituted by the inside face of a hollow body such as a hollow cylinder.

BRIEF DESCRIPTION OF THE DRAWINGS

Specific embodiments of the invention will now be described, purely by way of example, with reference to the accompanying drawing in which.

DETAILED DESCRIPTION

Figure 1:
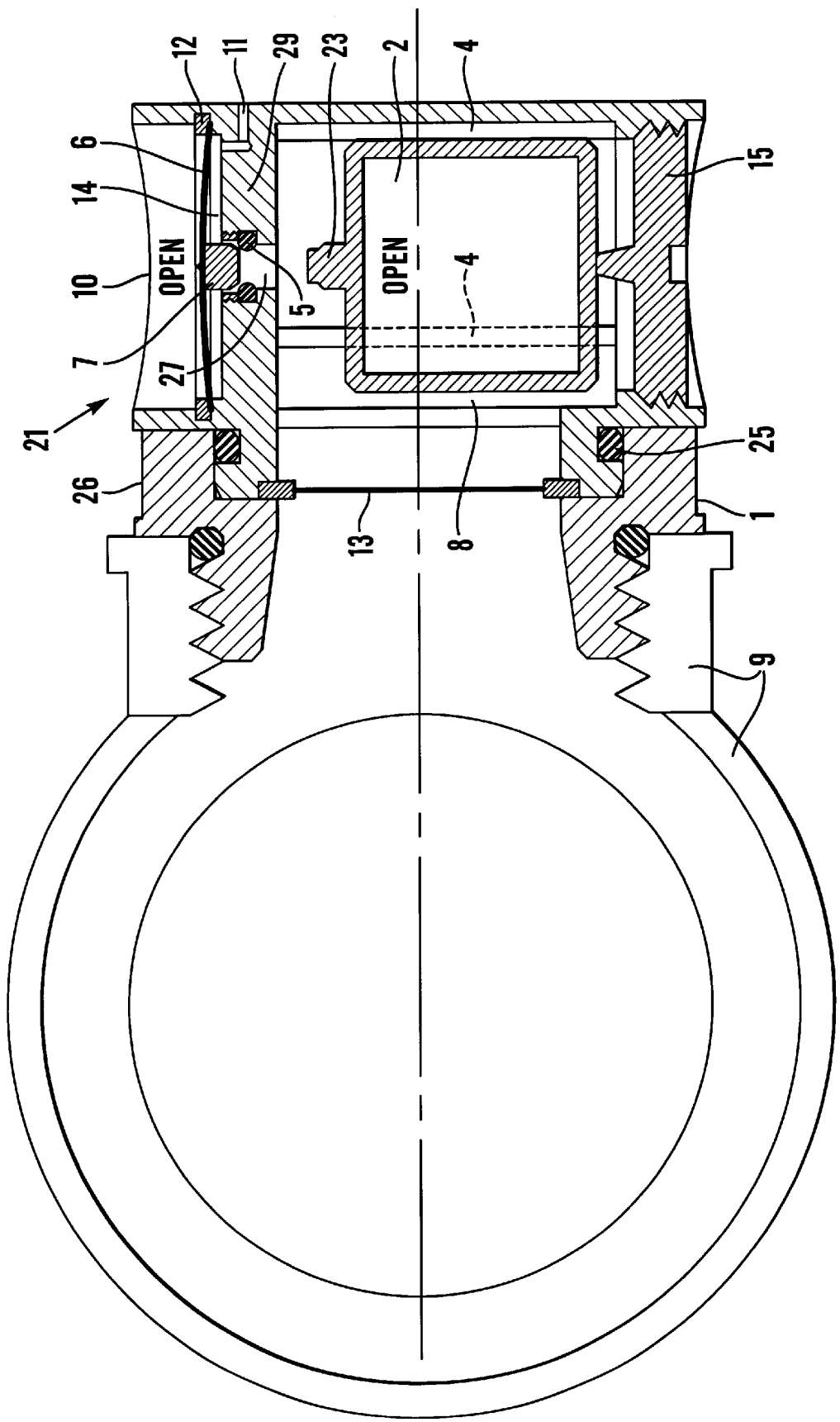
FIG. 1 shows a side section of a first embodiment of the vent according to the invention attached to a radiator vent port with the vent in the "cold" position and the radiator expelling air. This diagram applies for system draining conditions also.
Figure 4:
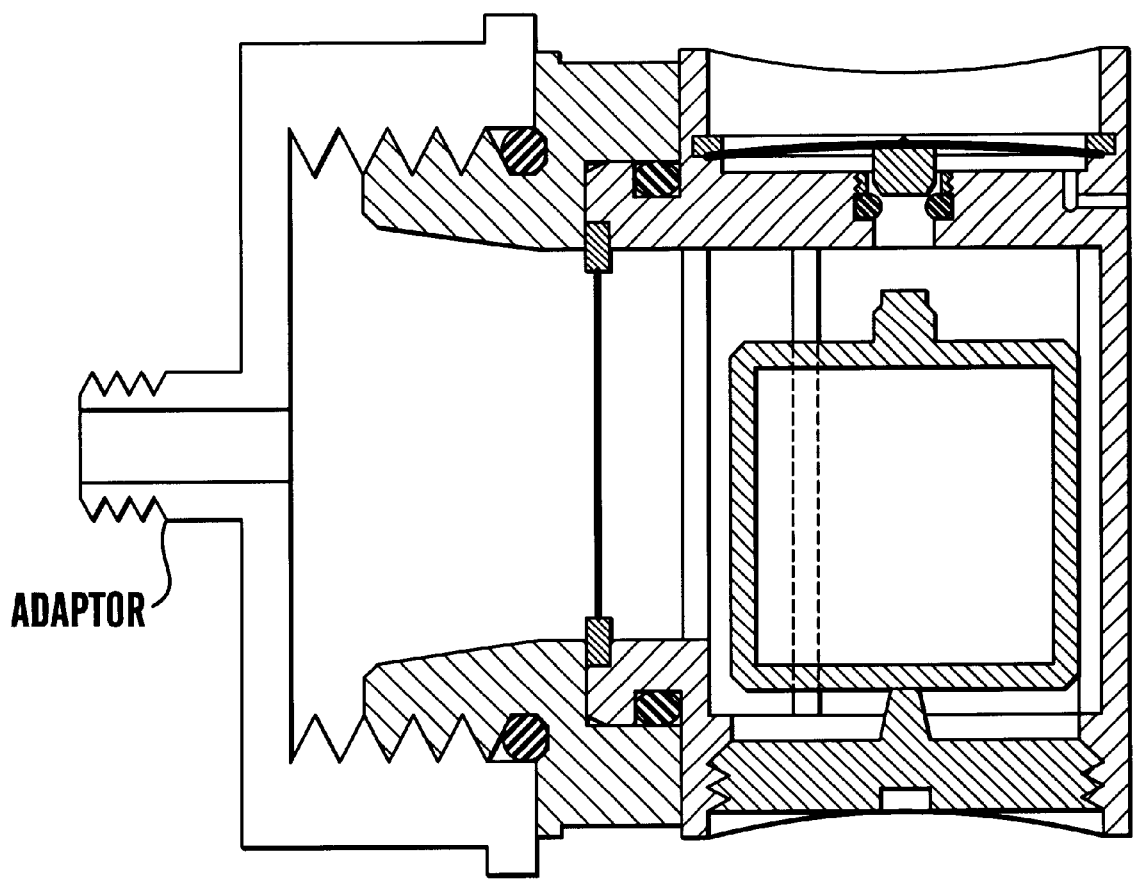
FIG. 4 shows an adaptor for narrow-threaded radiator vents.

Referring to the drawing FIG. 1, the automatic venting device (vent) of the first embodiment comprises a body having a housing (10) rotatably mounted on a collar (1). The vent may be secured via a collar (1) to a radiator vent port (9) on a system, either by the standard sized thread, or, via an adapter as shown in FIG. 4 which is used for the narrow threaded type radiator vents.

The vent comprises a float valve (2) which is centred and rides inside the housing (10) located by guide rails (4), between a raised closed position (FIG. 2) and a lowered open position (FIG. 1). In the closed position the float engages with a valve seat (5) arranged around an orifice (27) in a plate member (29).

The housing defines an entry port (8), and an exit vent 11; there is a vent path between the entry port (8) and the vent through the orifice, that is closed when the float is in its closed position engaging the valve seat and so closing the orifice. The port (8) contains a gauze (13).

The float is shaped so that the airflow dynamics on its surfaces allow it to remain open with air flowing over it until a point where it engages the valve seat (5), due to floatation, to close the orifice. The float has no protuberances and tends to "depress" rather than rise when the venting air expels. The float can only raise via floatation by water entering the vent housing via the port (8) strained through the gauze (13). Integral to the float (at the top) is the float valve piston (23) that meets the seat (5) when raised.

Figure 3:
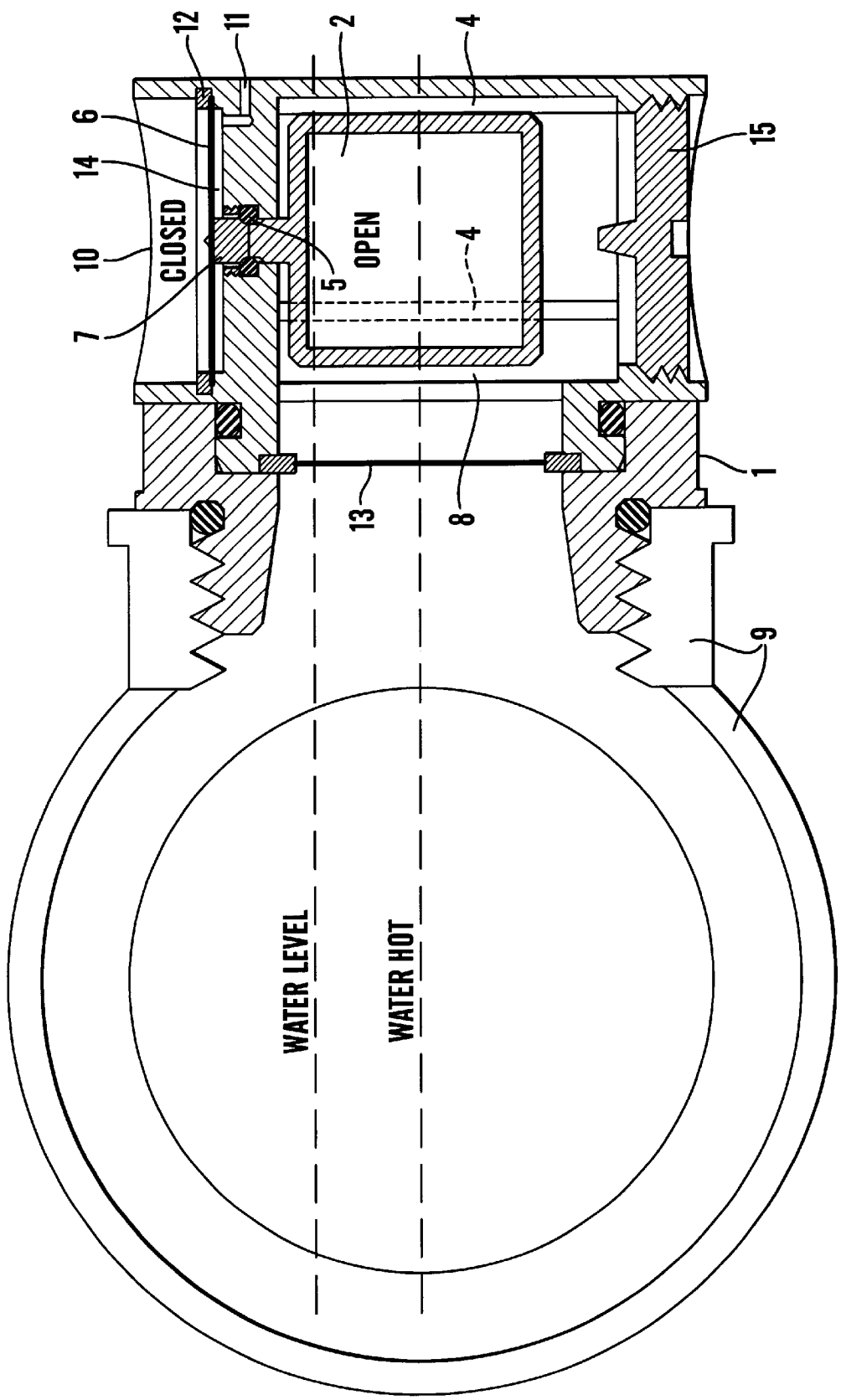
FIG. 3 shows the vent in the "hot" condition with the thermo-expansion valve operated and the float depressed (Auto-venting mode).

In addition, there is a subsidiary valve in the form of a thermal expansion disc valve (21) taking the form of a single metallic convex disc (6) which when heated to a predetermined temperature "inverts". The disc is located above a cavity (14). Attached to the disc (6) is a thermal valve piston (7) which upon operation performs two functions. Firstly, it moves from its vent position to an operation position in which it engages against the upper portion of the valve seat (5) thus preventing air egress. Secondly, it depresses and unseals the float valve (FIG. 3).

Exit port (11) acts as a vent to allow expulsion of air, while maintaining a restricting "back-pressure" that prevents escaping air from ramming the float valve closed before it closes via floatation from the correct water level being achieved. Blanking cap (15) seals the float chamber and circlip (12) retains the thermal expansion valve.

Figure 8:
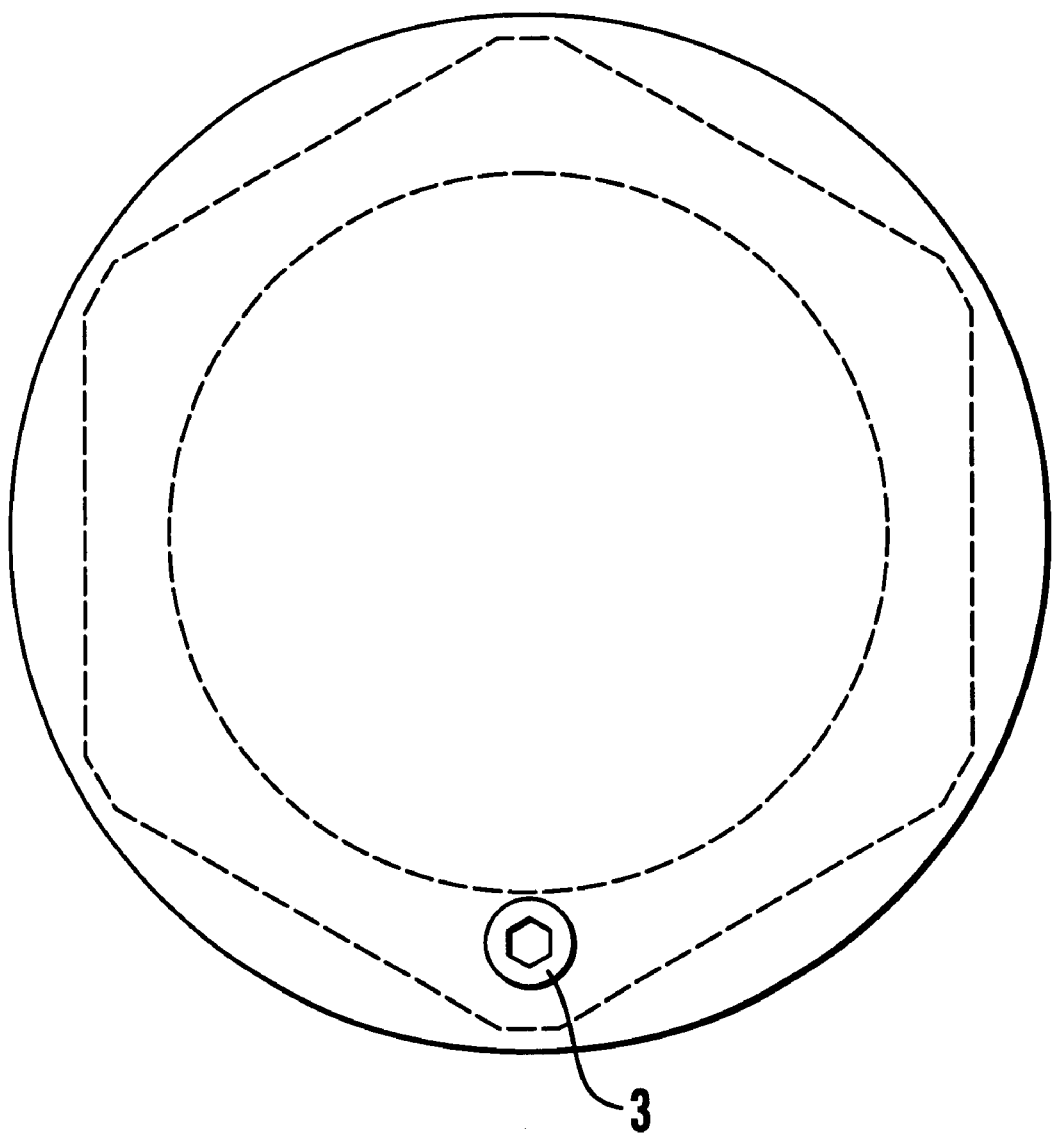
FIG. 8 shows an end view to illustrate the attachment of the vent to the system.

The collar has a hexagonal portion (26) so that the unit may be screwed into the radiator valve port by using a spanner. The vent housing (10) is now rotated by hand to the correct operating orientation (with the float valve in the vertical position) and secured at this angle by the grub screw (3) (FIG. 8). O-rings (25) seal the housing (10) to the collar (1) and the collar (1) to the radiator vent port (9).

In operation two modes are to be considered
 (a) Initial system filling and emptying with float valve actuating upon water reaching a pre-determined height, and
 (b) Thermal-expansion valve actuation upon system reaching a pre-determined temperature (Auto-venting mode).

Figure 2:
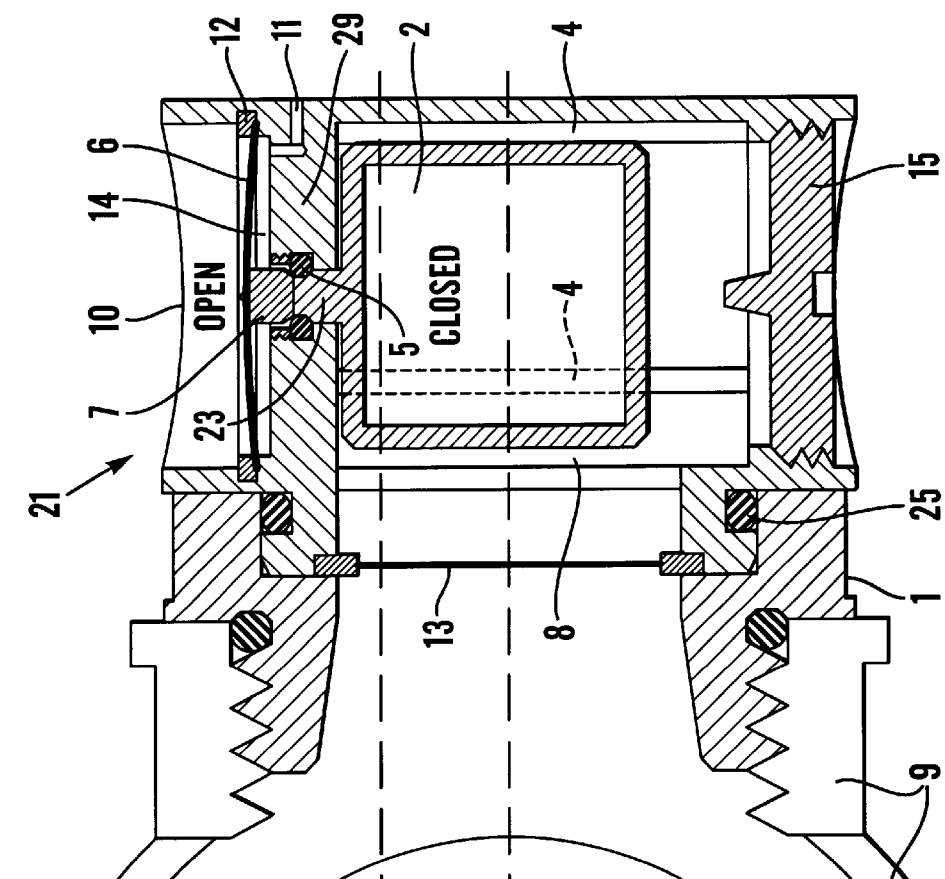
FIG. 2 shows a cut-away view of the vent in the "cold" condition with the float valve raised (floated) position with cessation of air expulsion.

(a) System filling/emptying is performed while the system is cold. Once the apparatus has been installed the radiator will fill with water as the system is "primed". During this process, air present in the empty radiator evacuates through a vent path consisting of the entry port (8), past the float (2) in its open position, through orifice (27), and out of the thermal expansion valve air cavity (14) via the exit port (11). Air expulsion continues until a sufficient level of water in the radiator enters the entry port (8), floats the float valve (2) and its piston (23) seats against seat (5), preventing further venting (FIG. 2). The radiator is now fully vented and operational. At a time when the system needs emptying (to replace the radiator, clean the system, introduce rust inhibitors, or fix a leak) the system needs to be drained. This is performed with the system cold and is the reverse of the above process. The system can be emptied normally via a drain plug that will have been fitted to a system "low-point". The process of draining water causes a vacuum in the radiator which sucks the float down into its unfloated position and allows air to be drawn into the apparatus via exit port (11), past the valve seat (5) through entry port (8) and into the radiator allowing complete system draining.

(b) Auto-venting mode, shown in FIG. 3, takes place as the radiator heats and cools. If the only mechanism in the vent was a float valve no auto-venting could take place because when air gradually fills the top of the radiator, even though the water level falls, the float valve would remain sealed due to the system pressure inside the radiator (approximately 1–1.2 bar) keeping it in place. Consideration was given to enlarging the float sufficiently that its weight caused it to fall with the water level, but this defeated the object. This method required a very large float. Instead, the problem was overcome in the apparatus according to the first embodiment using a thermally activated subsidiary valve.

In standard operating conditions the float valve will be raised with the water level to seal against seat (5), as shown in FIG. 2.

When the system heats up and reaches a pre-determined temperature FIG. 3 (approximately 45° C.), the thermal disc (6) "inverts" due to thermal expansion in a similar way to the type of thermal shut-off in a domestic kettle. The result of this is two-fold. Firstly, the disc's piston (7) seals against the seat (5) preventing expulsion of air or water. Thereafter, the piston (7) depresses the top of the float pushing the float down into its chamber, breaking its seal on the seat (5) and thus resetting it.

The thermal discs remain inverted until the apparatus body temperature drops below 35° C.

Below 35° C. the thermal valve returns to the "cold", open position shown in FIG. 1. From here, if air has leaked into the radiator the water level will not be high enough to raise the float, therefore air will be vented until the water level raises the float and seals, completing venting. On the other hand, if there is no air in the system the float will raise immediately and shut off before water can escape. This automatic venting cycle occurs each time the thermal valve operates.

Additional features relevant to this invention are that the top of the thermal valve may be manually depressed to ensure the system has fully vented.

It is envisaged that the float will be filled by a gas less dense than air so as to increase its buoyancy, therefore potentially reducing the float size.

Scaled-up or -down versions of the vent may be used for radiators with smaller or larger vent holes, or an adapter such as that shown in FIG. 4 may be utilised to attach the vent to the radiator/heating system.

Alternative thermally-activating valves constructed in Bi-metal and substances with a high coefficient of thermal expansion (wax, alcohol etc) may also be used. However, a thermal disc is more convenient.

An alternative to the thermostatic valve is a pressure valve consisting of a "reservoir" that fills with vented air at elevated pressures (when the system heats, the system therefore air pressure raises). This could be utilised to unseal the float valve while the "pressure valve" seals.

Additionally, although the above embodiment is described as being a vent for a radiator system the vent could be used for venting other heated/cooled systems requiring a venting mechanism (such as oil, liquid gas, refrigeration situations, or medical applications/human body), where the liquid element activates the float valve and a temperature change operates a thermal valve acting upon the float.

A second embodiment of the invention will now be described with reference to FIGS. 5–8. Like parts are given like numbers to those of the first embodiment.

The body has a housing (10) which defines an internal cylindrical chamber (33). An inner cylinder (35) extends into the chamber (33) at its top defining an annular pocket (37) between the inner cylinder (35) and the chamber (33) walls.

A subsidiary valve member (39) is located inside the chamber (33) and has a piston (41) extending inside the inner cylinder. The subsidiary valve member (39) is vertically moveable and located by the inner surface of the chamber (33) and the piston engaging with the inner walls of the inner cylinder (35).

The piston (41) has an orifice (27). Accordingly, in the initial position there is a vent path defined by the housing from the collar (1) through the chamber (33), the orifice (27) and the axial port (51) to the vent port (11).

As in the first embodiment, the vent housing (10) is secured via collar (1) to the radiator vent port (9). The unit may be screwed into the radiator valve port by using a spanner on the hexagonal portion of the collar (1). The vent housing (10) may be rotated to the correct operating orientation (i.e. the float in the vertical position) and secured at this angle by a grub screw (3) (FIG. 8) to keep the valve vertical. The housing (10) is cylindrical and attaches via flange (31) to the collar (1), the two being sealed via o-ring (25).

The subsidiary valve member (39) is biased downwards by a compression spring (47) in the annular pocket (37). The member (39) has upper and lower piston rings (o-rings) (48) seated in grooves (49) in the surface of the piston (41) that ride inside the inner cylinder (35). The o-rings (48) seal to the inner wall of the inner cylinder (35). An axial port (51) in the inner cylinder (35) provides a vent path from the chamber (33) through a cavity (53) at the top of the chamber to exit port (11) when the upper piston-ring is below the port (51). When upper piston-ring is above the port (51) gases are trapped between upper and lower piston-rings and no through passage of gas is possible. The body of the subsidiary valve rides inside housing chamber (33) so only axial movement of subsidiary valve (39) is possible.

Subsidiary valve (39) sits on top of hygroscopic fibre washers (43) that are located in housing chamber (33). The fibre washers expand when immersed in liquid, such that their height (and to a degree the outside diameter) increase. The internal bore size does not increase, so not trapping float (2). They contract when dry.

Float valve (2) is centred via the spigot (45) on its base that rides within housing chamber seal (15). Float valve piston (55) will seal in the raised position against the orifice (27) in the piston. There is a cavity (53) at the top of the float valve (2).

A housing cap (61) above the cavity (53) supports pin (63) that impinges upon the float piston (55) when the float is in the closed position and subsidiary valve (39) raises sufficiently. The cap (61) is threaded so its removal will prevent a vacuum from forming in the radiator while system draining.

Gauze (13) seated trapped between collar (1) and a flange (18) prevents particles from entering the valve but allows water access and egress.

In operation two functions are to be considered (a) System venting with both float valve and hygroscopic valve open and float valve closing when radiator has finished venting and (b) Hygroscopic valve operational and float valve reset when fibre washers have expanded.

Figure 5:
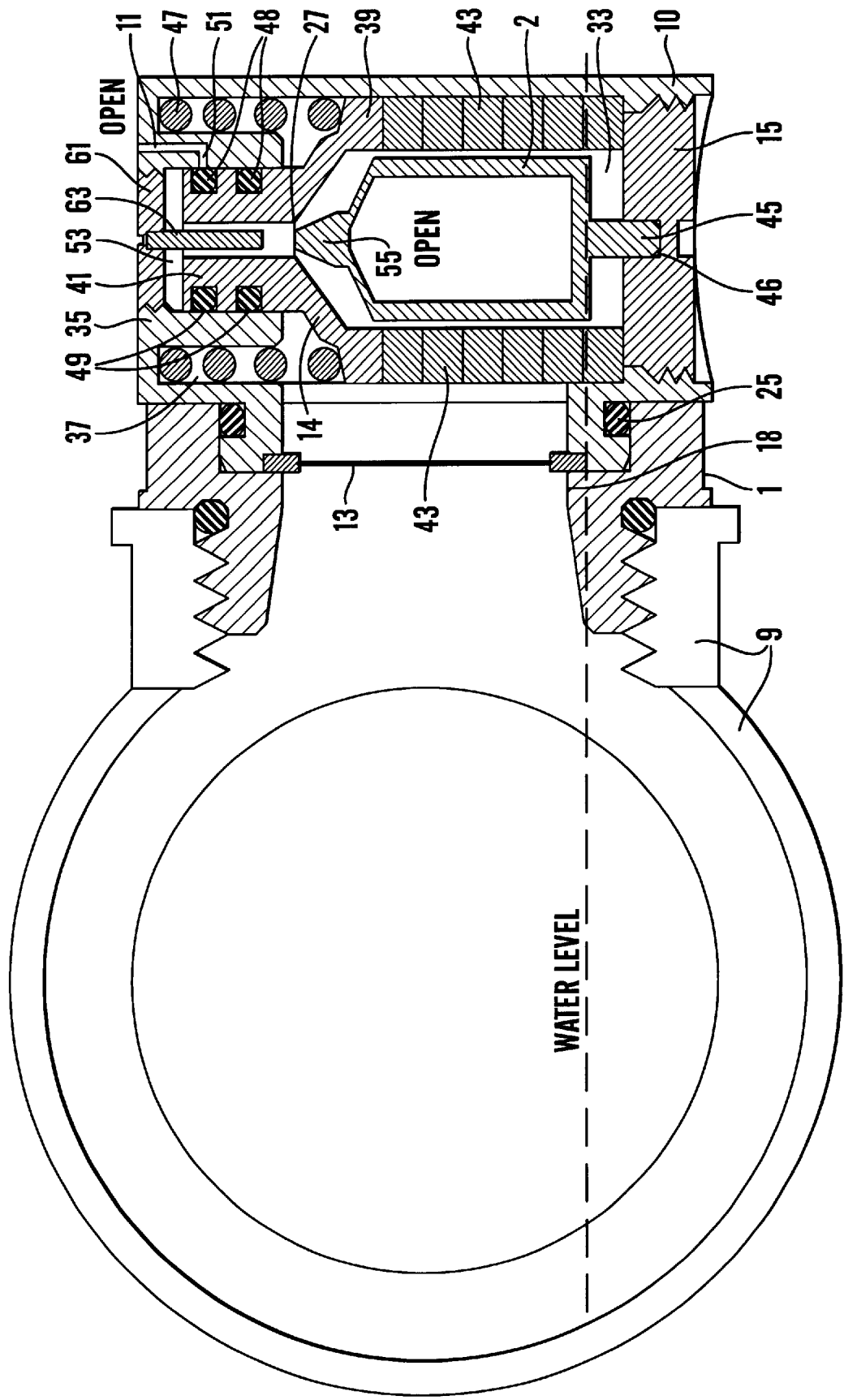
FIG. 5 shows a side cross-sectional view of the vent valve according to a second embodiment attached to the radiator vent port with the vent in the open position and the radiator expelling air.

(a) System venting (FIG. 5)

Figure 6:
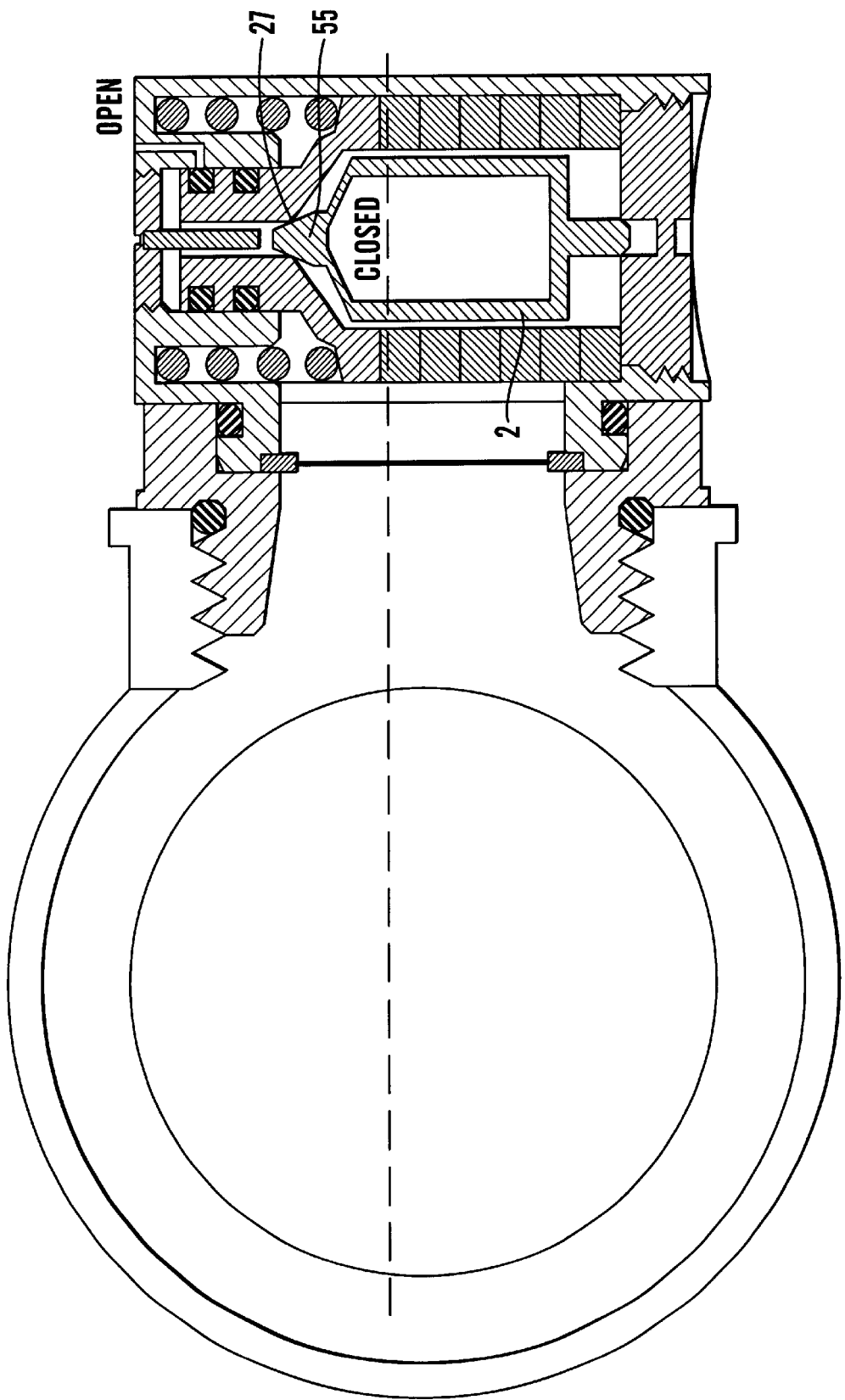
FIG. 6 shows a like view of the vent of FIG. 5 with the float valve in the raised (floated) position with cessation of air expulsion.

Once the vent has been installed the radiator will fill with water as the system is "primed". During this process, air present in the empty radiator evacuates through the passage consisting of inlet port (8), past (dry) fibre washers (43), into chamber (33), passed float (2), through the orifice (27), into housing valve cavity (53) past the top of subsidiary valve piston (41) and out through exit port (51) to the vent 11. This "venting" of air continues until float valve (2) raises due to buoyancy so its piston (55) seals against seat (29) to close the orifice (27), thus shutting off air egress (FIG. 6). Internal system pressure builds (approximately 1 bar pressure) and forces float valve home.

Figure 7:
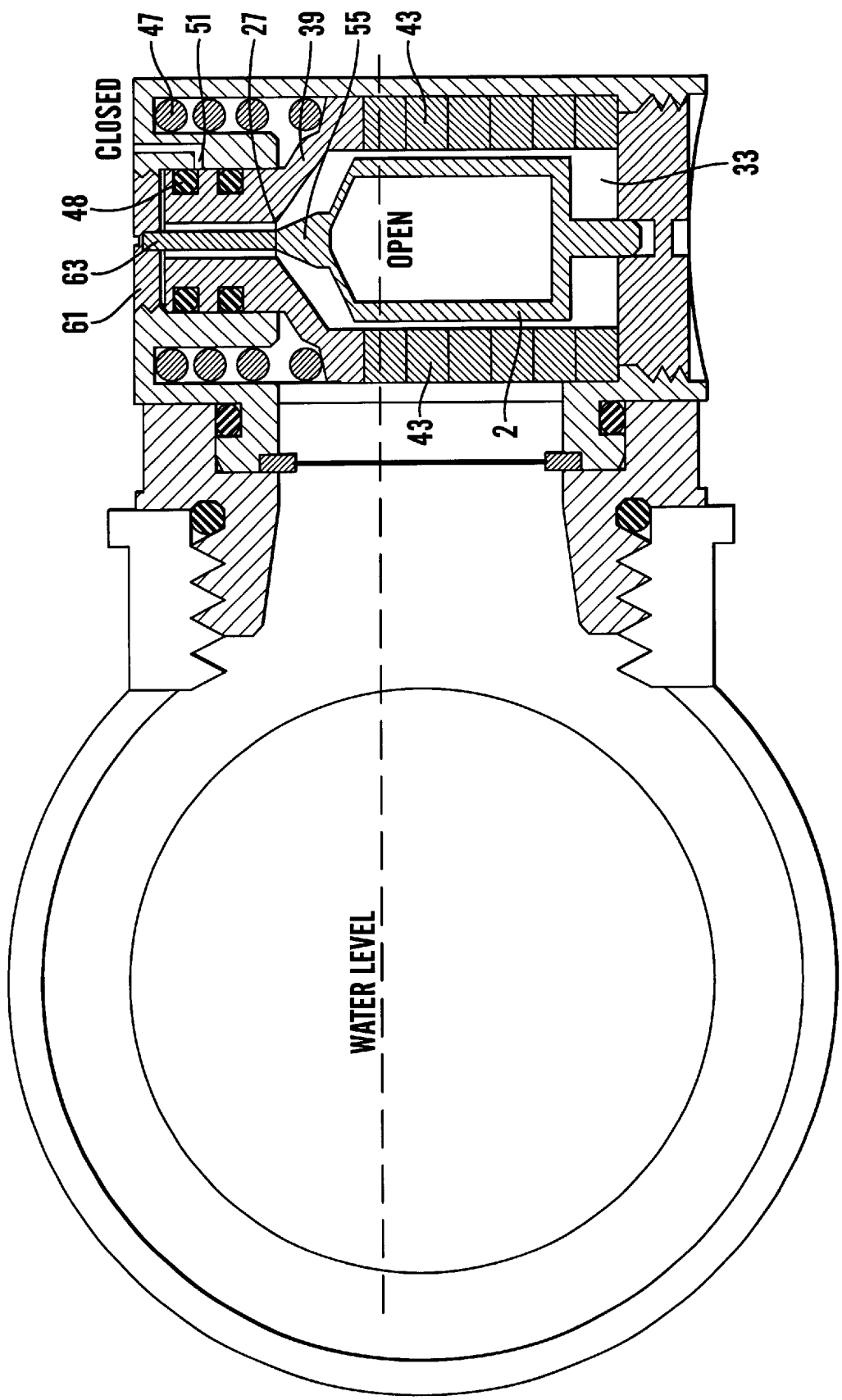
FIG. 7 shows the vent of FIG. 5 in the "wet" condition with the fibre washers expanded and the float reset.

(b) Hygroscopic valve operation (FIG. 7). This takes place as the fibre washers absorb water and expand.

When the fibre washers (43) expand, the subsidiary valve (39) raises against spring (47) pressure and two functions occur. Firstly, the upper o-ring (48) moves past exit port (51) forming a seal between the two o-rings and the exit port, which seals to prevent all air egress. Secondly, the pin (63) pushes against float piston (55) unsealing float (2) thereby resetting it to vent again.

The process cycles back to the first function when air enters the radiator. The hygroscopic washers (43) dry out as they are now only in contact with air at the top of the radiator instead of water, thus causes them to be depressed by spring (47) pressure and consequently subsidiary valve (39) depresses along with top piston o-ring (48) moving below exit port (51) allowing venting to occur and subsequent cessation of air expulsion when float valve (2) raises as described in function (a) above.

Additional features relevant to this invention are that the top (61) of the vent valve may be removed to provide a mechanism for system draining. When system drain cock is opened a vacuum forms in the radiators if the vent is sealed so removal of housing cap (61) allows air to enter the system and drain.

Float reset pin (63) may contain an "umbrella" mechanism on the end that opens when it moves past the orifice (27) into the chamber 33; this will ensure the orifice (27) remains clean for float valve (2) operation and seal of float valve piston (55); it closes when subsidiary valve (39) depresses. Its function is to prevent deposits from forming on the end of orifice (27).

Additionally, the apparatus could be used for venting other heated/cooled systems requiring a venting mechanism (such as oil, liquid gas, refrigeration situations, or medical applications/human body, where the liquid element activates the float valve and operates the hygroscopic valve acting upon the float.

What is claimed is:

1. An automatic venting device for venting gas from a system containing liquid, comprising
    a body defining a connector (1) for connecting to the system, a vent (11), a member (29) defining an orifice (27), and a valve seat (5) on the member (29), the body defining a vent path from the connector (1) through the orifice (27) to the vent (11),
    a float valve (2) movable between a closed position in which it engages the valve seat (5) to close the vent path, and an open position in which it is spaced away from the valve seat (5) to open the path, wherein the float valve sinks towards the open position in the absence of liquid in the system but is floated towards the closed position when liquid in the system reaches a predetermined level, and
    a subsidiary valve (21, 39) movable between a vent position leaving the vent path open and an operation position in which the vent path is closed, wherein movement of the subsidiary valve (21, 39) to its operation position from its vent position acts to displace the float valve (2) from its closed position.

2. An automatic venting device according to claim 1 wherein the subsidiary valve (21, 39) is a thermostatic valve which moves to the vent position below a predetermined temperature and to the operation position above the predetermined temperature to close the flow path and engage the float valve to displace it from the closed position.

3. An automatic venting device according to claim 2 wherein the subsidiary thermostatic valve (21) comprises a thermal disc that inverts above the predetermined temperature to seal the orifice (27) and displace the float valve.

4. An automatic venting device according to claim 3 further comprising a piston (7) attached to the subsidiary thermostatic valve arranged so that in the operation position the piston (7) extends through the orifice into the chamber to displace the float valve (2), and the piston retracts through the orifice in the vent position.

5. An automatic venting device according to claim 1, further comprising hygroscopic material (15) arranged to expand when in contact with liquid to move the subsidiary valve (39) to its operation position, and contracts when the liquid level falls to allow the subsidiary valve to move to its vent position.

6. An automatic venting device according to claim 5 wherein the orifice (27) is in the subsidiary valve.

7. An automatic venting device according to claim 6 wherein a pin (63) is provided so that as the subsidiary valve moves to its operation position the pin (63) protrudes through the orifice to displace the float valve.

8. An automatic venting device according to claim 1 wherein as the subsidiary valve moves away from its vent position to the operating position the subsidiary valve seals before the float valve is displaced.

9. An automatic venting device according to claim 1 wherein the float valve (2) is sufficiently light that when the system is pressurised air pressure retains the float valve in its closed position even when the liquid level sinks.

10. An automatic venting device according to claim 1 further comprising guide means (4) locating the float valve while allowing it to move between open and closed positions.

* * * * *